(12) United States Patent
Zhou et al.

(10) Patent No.: US 7,894,647 B2
(45) Date of Patent: Feb. 22, 2011

(54) SYSTEM AND METHOD FOR 3D CONTOUR TRACKING OF ANATOMICAL STRUCTURES

(75) Inventors: Xiang Sean Zhou, Plainsboro, NJ (US); Dorin Comaniciu, Princeton Jct., NJ (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 966 days.

(21) Appl. No.: 11/154,349

(22) Filed: Jun. 16, 2005

(65) Prior Publication Data

US 2006/0008138 A1    Jan. 12, 2006

Related U.S. Application Data

(60) Provisional application No. 60/581,545, filed on Jun. 21, 2004, provisional application No. 60/606,095, filed on Aug. 31, 2004.

(51) Int. Cl.
*G06K 9/00* (2006.01)
(52) U.S. Cl. .................. 382/128; 382/103; 382/154
(58) Field of Classification Search ............... 382/103, 382/154, 128, 134, 209, 231
See application file for complete search history.

(56) References Cited

U.S. PATENT DOCUMENTS 6,757,571 B1 * 6/2004 Toyama ........................ 700/47
7,130,446 B2 * 10/2006 Rui et al. ..................... 382/103
2002/0172407 A1 * 11/2002 O'Donnell et al. .......... 382/131

OTHER PUBLICATIONS

Mitchell S C et al: "3-D Active Appearance Models: Segmentation of Cardiac MR and Ultrasound Images" IEEE Transactions on Medical Imaging, IEEE Service Center, Piscataway, NJ, US, vol. 21, No. 9, Sep. 2002, pp. 1167-1178, XP001164033 ISSN: 0278-0062 the whole document.
Bosch J G et al: "Fully automated endocardial contour detection in time sequences of echocardiograms by three-dimensional active appearance model s" Proceedings of the SPIE—The International Society for Optical Engineering SPIE—Int. Soc. Opt. Eng USA, vol. 4684, 2002, pp. 452-462, XP002373409 ISSN: 0277-786X the whole document.
Gokturk S B et al: "A new 3-D volume processing method for polypdetection" International Conference of the IEEE Engineering in Medicine and Biology Society. 2001 Conference Proceedings. (EMBS). Instanbul, Turkey, Oct. 25-28, 2001, Annual International Conference of the IEEE Engineering in M, vol. 1 of 4. Conf. 23, pp. 2522-2525, XP010592168 ISBN: 0-7803-7211-5 the whole document.

(Continued)

*Primary Examiner*—Brian Q Le
*Assistant Examiner*—Edward Park
(74) *Attorney, Agent, or Firm*—Donald B. Paschburg; F. Chau & Associates, LLC (57) ABSTRACT

A method for three-dimensional contour tracking includes building a plurality of shape models, building a plurality of appearance models, training a learning/classification algorithm using said shape models and appearance models, localizing a contour using the said learning/classification algorithm about an object in a digitized image, and tracking said contour along said object in 3D incorporating said learning/classification algorithm.

22 Claims, 4 Drawing Sheets

OTHER PUBLICATIONS

IOFFE 5: "Red eye detection with machine learning" Proceedings 2003 International Conference on Image Processing (Cat. No. 03CH37429) IEEE Piscataway, NJ, USA, vol. 3, 2003, pp. 11-871, XP002373410 ISBN: 0-7803-7750-8 the whole document.

Cootes T et al: "Multi-resolution method for improving image search" BMVC94. Proceedings of the 5th British Machine Vision Conference BMVA Press Guildford, UK, vol. 1, 1994, pp. 327-336 vol. 1, XP008065550 ISBN: 0-9521898-1-X p. 327-p. 334.

Kang S K et al: Hierarchical approach to enhanced active shape model for color video tracking Proceedings 2002 International Conference on Image Processing, ICIP 2002. Rochester, NY, Sep. 22-25, 2002, International Conference on Image Processing, New York, NY : IEEE, US, vol. 2 of 3, pp. 888-891, XP010607467 ISBN: 0-7803-7622-6 the whole document.

Mahmoodi S et al: "Contour detection using multi-scale active shape models" Image Processing, 1997. Proceedings. International Conference on Santa Barbara, CA, USA Oct. 26-29, 1997, Los Alamitos, CA, USA,IEEE Comput. Soc, US, pp. 708-711, XP010254022 ISBN: 0-8186-8183-7 the whole document.

* cited by examiner

SYSTEM AND METHOD FOR 3D CONTOUR TRACKING OF ANATOMICAL STRUCTURES

CROSS REFERENCE TO RELATED UNITED STATES APPLICATIONS

This application claims priority from "Statistical 3D Contour Tracking for Anatomical Structures", U.S. Provisional Application No. 60/581,545 of Zhou, et al., filed Jun. 21, 2004, and from "A Unified Framework for Detection and Tracking of Anatomical Structures in 2D, 2D+T, 3D, and 3D+T Data", U.S. Provisional Application No. 60/606,095 of Zhou, et al., filed Aug. 31, 2004, the contents of both of which are incorporated herein by reference.

TECHNICAL FIELD

This invention is directed to tracking a shape of an object in an image sequence or a data volume.

DISCUSSION OF THE RELATED ART

Figure 1:
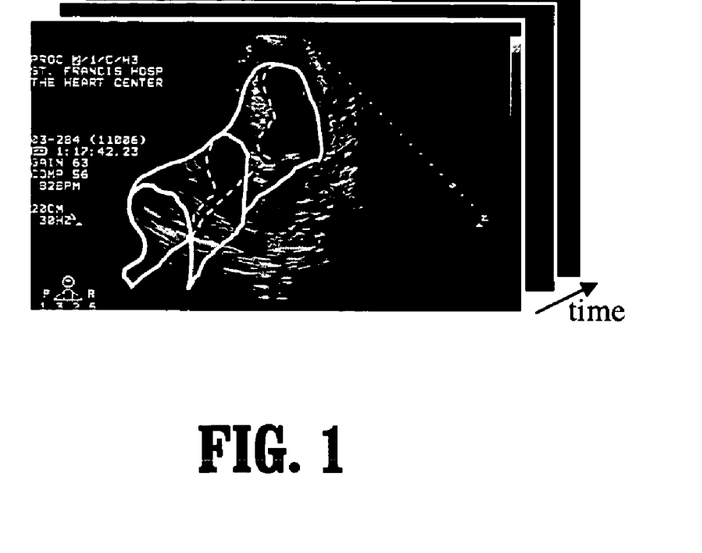
FIG. 1 illustrates the time evolution of a 2D contour, according to an embodiment of the invention.
Figure 2:
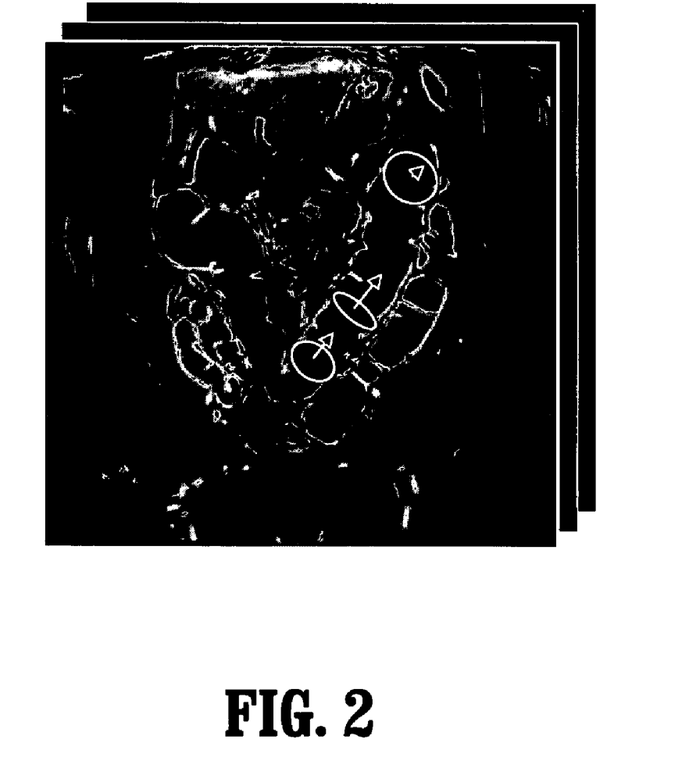
FIG. 2 illustrates a 2D contour being tracked in 3D, according to an embodiment of the invention.

Contour tracking involves the localization and tracking of objects, patterns, or anatomical structures in digital images, and is important in medical and non-medical applications. Contour tracking is often the enabling step for automatic or semi-automatic systems for computer aided diagnosis or decision support. For most tracking applications, measurement data are uncertain and sometimes missing: images are taken with noise and distortion, while occlusions can render part of the object-of-interest unobservable. Uncertainty can be globally uniform; but in most real-world scenarios, it is heteroscedastic in nature, i.e., both anisotropic and inhomogeneous. Tracking methods in 2-dimensions have been disclosed in these authors copending applications "System and Method for Local Deformable Motion Analysis", U.S. patent application Ser. No. 10/957,380, filed Oct. 1, 2004, and "System and Method for Tracking a Global Shape of an Object in Motion", U.S. patent application Ser. No. 10/794,476, filed Mar. 5, 2004, the contents of each being incorporated herein by reference in their entirety. In 2D tracking, an initial contour is a curve in a plane, which is then propagated in time. The contour traces out a 3-D structure resembling a pipe along a time-axis whose cross section is always perpendicular to the time axis. This 3-D structure represents how the shape of an object changes over time. A non-limiting example of a structure that can be modeled in this fashion is the left ventricle of the heart. An illustration of a time-like propagation of a 2-D contour is depicted in FIG. 1. Referring to the figure, the time axis extends into the plane of the diagram. An initial contour is indicated by a solid line in the lower left of the figure. The solid line in the center of the figure indicates the contour at a second time, while the solid time in the upper portion of the figure indicates the contour at a third time. However, although the plane of the contour can rotate, tilt, or turn as it propagates, it is limited in its representational power and the contour resides always inside the cutting plane at any given time instance. To generalize, a contour is a 3D space curve which one would want to propagate spatially to map out an anatomical structure, such as blood vessels or a colon. A non-limiting example of a tracked 3D contour that maps out an anatomical structure is depicted in FIG. 2. Referring to the figure, three ellipses with directed arrows are shown to indicate the contour shape and direction of propagation in a colon. The changes of eccentricity of the ellipses in the figure are indicative of turns and folds in the colon. Robust tracking of an adaptively oriented/deformed 3D contour requires the integration of multiple sources of information, both from the data and from prior knowledge and models, because noise, residual structures in the image, and artifacts from the imaging modality can distort the propagation of the contour. Furthermore, detection and tracking in 3D and 4D (i.e., 3D+Time) data is more demanding due to the increase of data volume, noise level, and/or computational complexity.

SUMMARY OF THE INVENTION

Exemplary embodiments of the invention as described herein generally include methods and systems for a database-guided learning approach for object or structure detection in 2D, 2D+Time, or 3D data, incorporating data matching techniques in a discriminative feature subspace. In addition, a unified tracking framework to take into account temporal or spatial correlations in 2D, 2D+Time, or 3D data, using multiple hypotheses expressed in terms of parametrical multi-mode density functions and their evolutions in time or space is disclosed.

According to an aspect of the invention, there is provided a method for three-dimensional contour tracking including building a plurality of shape models, building a plurality of appearance models, training a learning/classification algorithm using said shape models and appearance models, localizing a contour using the said learning/classification algorithm about an object in a digitized image, and tracking said contour along said object in 3D incorporating said learning/classification algorithm.

According to a further aspect of the invention, the shape models include 2-dimensional shape models, 3-dimensional shape models and dynamical models.

According to a further aspect of the invention, the method further comprises building a training set of 3-dimensional image volumes, and using said training set to train said learning/classification algorithm to recognize object shapes and appearances in said image volumes.

According to a further aspect of the invention, the training set includes negative examples of shapes and appearances.

According to a further aspect of the invention, the shape models are derived from said image volumes, from human expertise or from prior knowledge.

According to a further aspect of the invention, the appearance models are derived from said image volumes.

According to a further aspect of the invention, the appearance models are derived from tracking said contour along said object.

According to a further aspect of the invention, the method further comprises adaptively updating said shape models and said appearance models while tracking said contour along said object.

According to a further aspect of the invention, the learning/classification algorithm is based on Bayesian classifier, on boosting, or on a support vector machine.

According to a further aspect of the invention, the method further comprises searching for a counterpart of a shape of said object among said shape models and appearance models using a matching algorithm that uses shape and appearance features learned during training of said learning/classification algorithm.

According to a further aspect of the invention, the method further comprises providing a digitized volumetric image comprising a plurality of intensities corresponding to an N % N % N domain of points in a 3-dimensional space, initializing said contour about an object in a a low-resolution version of said image, tracking said contour along said object in said reduced resolution image to obtain a contour surface about said object, and re-tracking said contour surface along said object in said N % N % N image to correct errors in said contour surface in said reduced resolution image.

According to a further aspect of the invention, the contour is an open curve in a 2-dimensional plane, a closed curve in a 2-dimensional plane, an open curve in 3-dimensions, a closed curve in 3-dimensions, or a 3-dimensional surface.

According to another aspect of the invention, there is provided a program storage device readable by a computer, tangibly embodying a program of instructions executable by the computer to perform the method steps for three-dimensional contour tracking.

DETAILED DESCRIPTION OF THE PREFERRED EMBODIMENTS

Exemplary embodiments of the invention as described herein generally include systems and methods for matching and detecting object shapes or anatomical structures in test images from the joint use of appearances and shapes derived from a training image set. The appearance is used for localization of the object/structure in the test image, and a matching process is employed to find similar cases from the positive training data set, and to provide the shape/structural details for the detected/localized candidate. The detection, localization, and matching can be done in a hierarchical manner to achieve more accurate results. The matching process can use the features learned during the detection process to save computation time and to improve matching performance.

As used herein, the term "image" refers to multi-dimensional data composed of discrete image elements (e.g., pixels for 2-D images and voxels for 3-D images). The image may be, for example, a medical image of a subject collected by computed tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to an embodiment of the invention, a general framework for object or anatomical structure detection and shape recovery includes three stages: an off-line training stage, an on-line detection stage, and an on-line shape matching stage. These stages are illustrated for a 2-D image in FIG. 3, and for a 3-D image volume in FIG. 4.

According to an embodiment of the invention, an off-line training stage includes constructing mathematical models of shapes and appearances. For the purpose of contour tracking, a shape refers to a border, that is, a curve or a surface, while an appearance refers to a voxel intensity pattern. These shape and appearance models can be previously defined models, or can be extracted from a set of training images. These models can include, for example, a mean value and a standard deviation for a size. If, for example, one is interested in studying a colon, colon data from patients previously examined can be analyzed to extract shapes and appearances that characterize a colon. The training data can take the form of a set of volumetric digital images, where the surfaces delineating a colon have been identified or annotated. The shapes can include both 2-dimensional and 3-dimensional models, dynamical models that can account how a shape changes as one propagates a contour along an object in an image. For example, with a colon, one needs to account for dilations and contractions along the medial axis of the colon, as well as turns and folds. The appearance models include those models learned from the training set that capture the voxel intensity patterns of the interior and exterior of a colon. Once constructed, the shape and appearance models can be stored in a database. Examples of 2D training models are indicated by ref. 31 in FIG. 3, and 3D examples by ref. 41 in FIG. 4.

According to an embodiment of the invention, the training data can also include negative examples, that is, examples of what is not being sought. The negative examples help setting limits on how far a contour can deviate from a model shape and how different the associated appearance can be from a model appearance.

Figure 3:
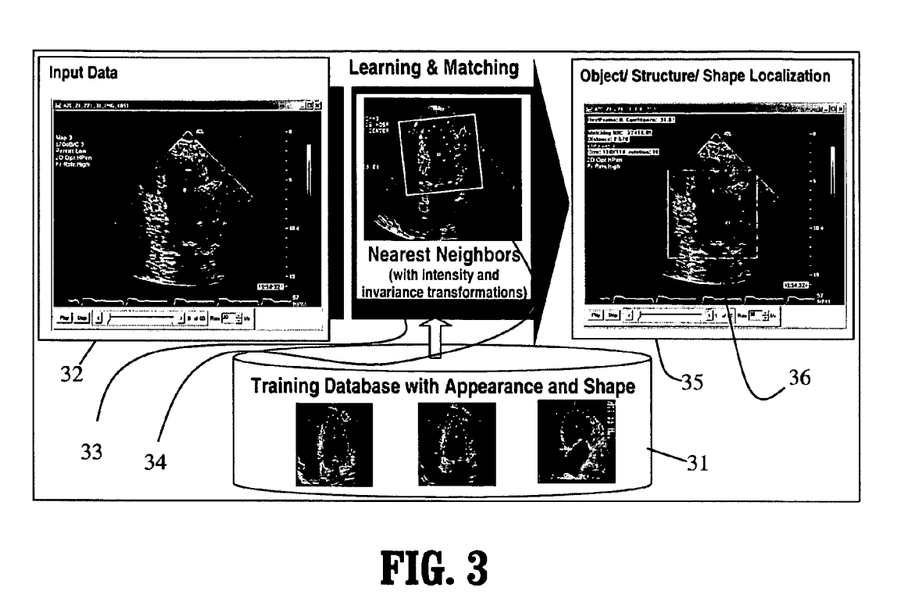
FIG. 3 is a schematic diagram of a detection system, according to an embodiment of the invention.
Figure 4:
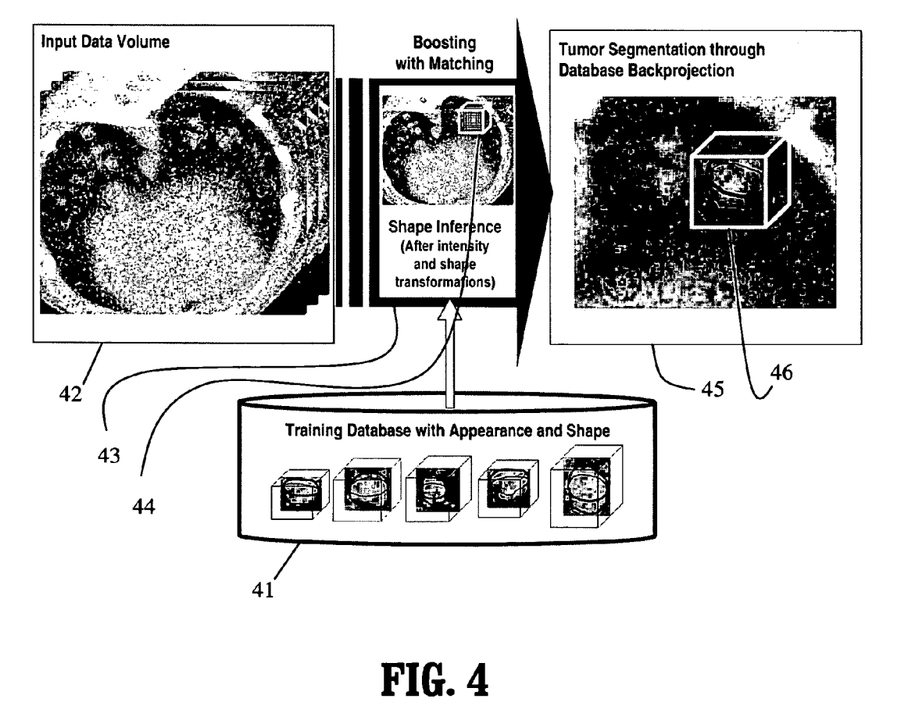
FIG. 4 is a schematic diagram of tumor detection in a 3D data volume, according to an embodiment of the invention.

In the off-line training stage, all positive training samples should be processed to maintain invariant properties. For example, global translation, rotation, and scale can be set as invariant transformations for left ventricle of a human heart. The alignment of the positive training samples can influence the design of the detector, as each alignment axis will need to be expanded or "searched back" during detection. In other words, for example, if rotations are canceled out in the training data, the detector has to search multiple rotations during detection. With aligned training data, a learning algorithm can output selected features and the corresponding decision function for positive/negative classification. One can also transform all training data (scaling and rotation) together to train transformed detectors. All of the features for the training data, including the transformed training data, should be stored in the database 31, 41.

Once mathematical models of the shapes and appearances have been constructed, a learning/classification algorithm can be trained on these shapes and appearances in order to detect and localize structures characterized by these shapes and appearances for an anatomical object of interest. There are many learning/classification techniques well known in the art that can be used. An exemplary, non-limiting list of such techniques includes Bayesian classifiers, boosting, and support vector machines.

According to an embodiment of the invention, an on-line detection stage begins when a data input is provided for analysis, which can be an image in a sequence, a slice in a 3D data volume, or a 3D volume in a 3D+time volume sequence. FIG. 3 depicts a 2D image 32 as input data, while FIG. 4 depicts a series of slices 42 of a 3D volumetric image as input. The learning/classification algorithm 33, 43 can be applied to the input data to localize the contour. A contour can be an open or closed curve in a 2D plane or in 3D, or it can be a surface in 3D. Once localized, the contour can be tracked along the object, tracing out a surface. During tracking, one or more of the new input images/slices/volumes can also be input to the learning/classification algorithm to be combined with training set shapes to obtain detection results. In the detection stage, a scanning scheme for the image or data volume is employed through translating, rotating, and/or scaling a window inside the data volume to yield the candidate data patches. For a 2-D image, the window can be a box 34 as indicated in FIG. 3, while for a 3-D volumetric image, the window would typically be a 3-D polygon or cube 44, as indicated in FIG. 4. In both the 2-D and 3-D cases, other shapes can be used as well. For each candidate, features are extracted and the classification function is applied. Temporal or spatial correlations can be taken into account through techniques such as optical flow. The decision on the object location, scale, and/or rotation is reached either during or after the whole scanning process. In some cases, applying multiple transformed detectors is faster than transforming the candidate.

According to an embodiment of the invention, in a shape matching stage 35, 45, a similarity matching algorithm searches for counterparts of the appearance of a winning candidate, as indicated by box 36 and cube 46 in FIGS. 3 and 4, respectively, to retrieve nearest neighbors from the corresponding training dataset, and their associated shapes are combined and applied to the candidate(s).

Information from measurements of the winning candidate can be combined with predictions based on an estimation of the system dynamics derived from the tracking process so far. Multiple hypotheses can be exploited for ambiguous cases, where, for example, there appears to be more than one path for propagating the contour. Multiple hypotheses can be expressed in terms of a parametrical multi-mode density function and its evolution in time or space. Once a candidate has been matched, the shape and appearance models can be adaptively updated according to the shape and appearance of the candidate. As a contour propagates, it can trace out shapes perpendicular to the direction of propagation about a medial axis. The resulting contours will have less variability than contours residing inside the coordinate planes. Such contours can also span 3D instead of 2D. The degree to which a contour changes as it propagates is constrained by the prior models and anatomical knowledge, and it can also incorporate dynamical models to account for shape changes as it propagates. The object being traced by the contour can be modeled by a probability distribution of states, where the states can characterize changes in the contour. For example, referring again to a colon, possible states include contracting, dilating, and folding. The probability distribution can be represented by a known, analytic function, or by particles as in a particle filter framework.

According to another embodiment of the invention, contour tracking methods can be applied at multiple size scales. The computation time of a contour tracking method can be increased by applying it to a low-resolution version of an image volume. For example, starting with a 512%512%512 image, a 256%256%256 image with half resolution can be extracted by smoothing and downsampling. Similarly, a 128%128%128 reduced resolution image can be extracted. This 128%128%128 contains 1/64 the number of voxels as the original 512%512%512 image, and a contour tracking method applied to this reduced image volume will be correspondingly faster. The shape traced out in the 128%128%128 image can be expanded to fit into the 256%256%256 image subset for correction and refinement, and then again expanded into the 512%512%512 image for further corrections. These corrections can be performed quickly as compared to tracing the contour in the full 512%512%512 image volume. The learning/classification algorithm and matching algorithm can be applied hierarchically from coarse to fine in this manner so that a more refined localization can be achieved.

Figure 5:
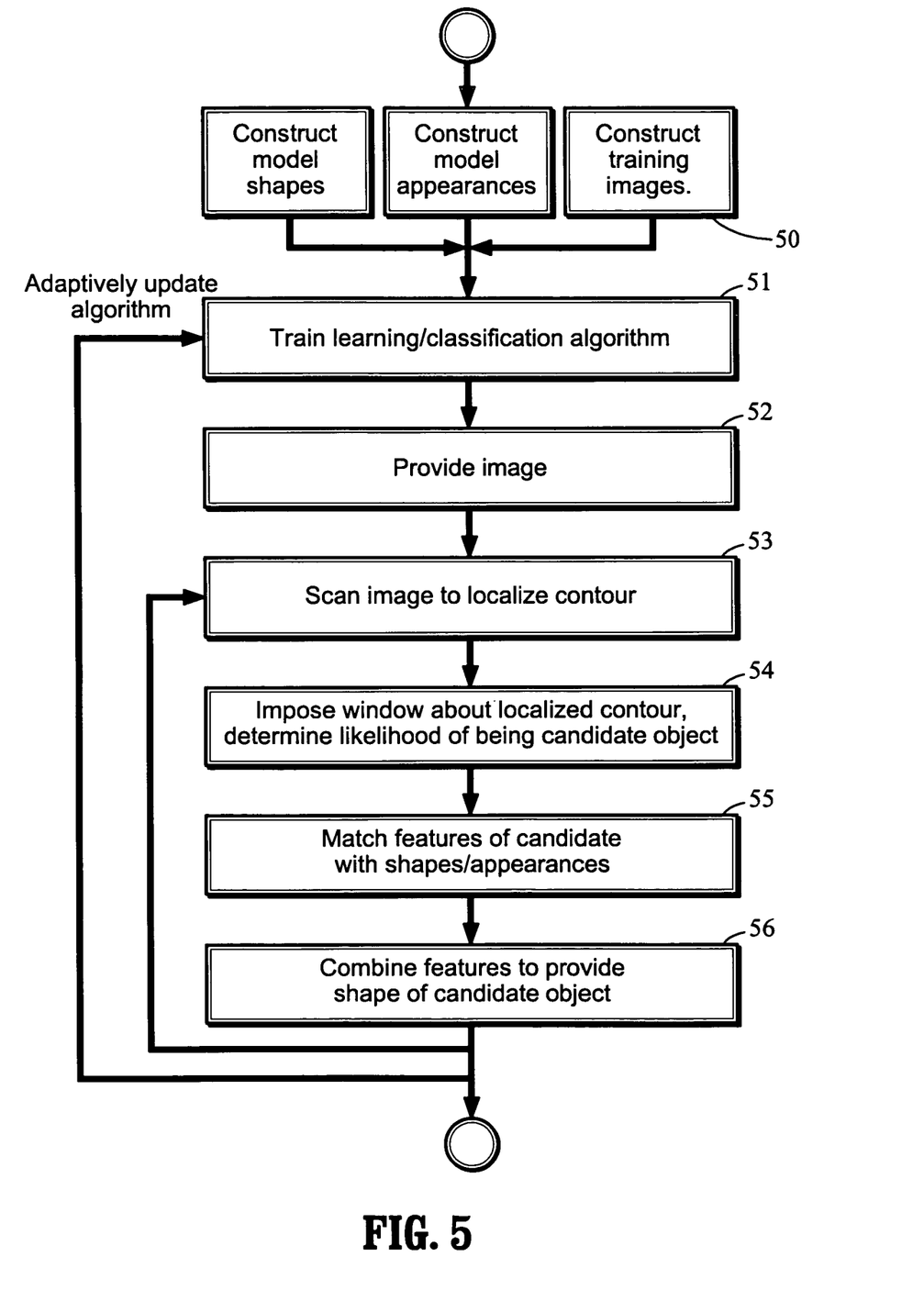
FIG. 5 is a flow chart of a detection method, according to an embodiment of the invention.

FIG. 5 is a flow chart of the detection method, according to an embodiment of the invention. Starting at step 50, training datasets are constructed. These training sets include sets of model shapes for the corresponding sets of image appearances. The training sets include objects that have been annotated or otherwise identified. In addition, these training datasets can include the negative examples described above. The training sets are stored in a database or other online data store. At step 51, these model shapes and appearances are used to train a learning/classification algorithm to recognize and classify the annotated objects in the training image datasets. The training includes defining a window about an object, and translating, rotating, and scaling the object as described above. Once the learning/classification training is complete, an image volume is provided at step 52. The learning/classification algorithm scans the image at step 53 at multiple locations, rotations, and scales in order to localize a contour. What transformations are applied at run-time depend on what transformations were conducted on the training sets for alignment. For each transformation, i.e., for each scanned location with a particular rotation and scale, the learning/classification algorithm imposes a window about the localized contour at step 54 and determines the likelihood of the windowed location being the candidate object. Once a candidate object is found, the matching algorithm is applied at step 55 to search the model shape and model appearance database for counterparts of features of the candidate object. Shapes "borrowed" from one or more matched models are combined to provide the shape for the candidate object at step 56. By repeating steps 53, 54, 55, and 56, the contour can be tracked. The results of the applying the learning/classification of steps 53, 54, 55, and 56, can then be used to adaptively update the learning/classification algorithm at step 51.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
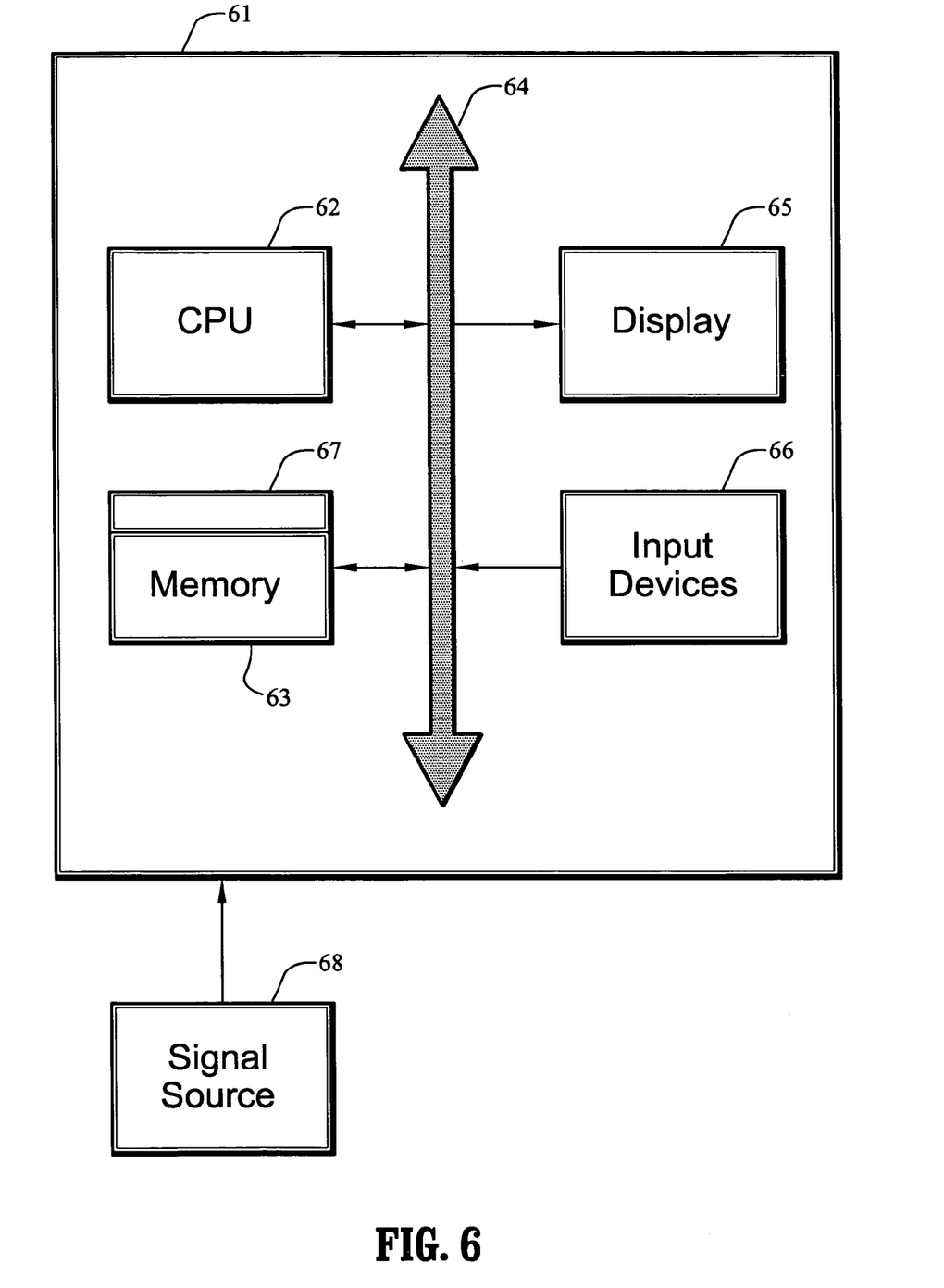
FIG. 6 is a block diagram of an exemplary computer system for implementing a contour tracking method, according to an embodiment of the invention.

Referring now to FIG. 6, according to an embodiment of the present invention, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Applications of the embodiments of the invention include, but are not limited to: tracking of shapes in time and space in 2D image sequences and 3D image slices; volumetric structure detection and segmentation using 2D contour tracking in 3D; and tracking for 3D+Time data, etc. Potential medical applications include the detection and segmentation of anatomical structures, including the heart, lung, lung nodules, colon, colon polyps, brain, liver, tumor, etc.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer implemented method for three-dimensional contour tracking comprising the steps of:
providing a database of a plurality of shape models and a plurality of appearance models, wherein shape models are curves and surfaces, appearance models are voxel intensity patterns, wherein said models include 2-dimensional shape models, 3-dimensional shape models and dynamical models that describe how a contour changes as it is propagated along on object in an image;
providing a learning and classification algorithm trained using said shape models and appearance models;
providing a digitized volumetric image comprising a plurality of intensities corresponding to an N×N×N domain of points in a 3-dimensional space;
extracting one or more candidate data patches of an object from one of said images;
calculating features from said data patches and applying said learning and classification algorithm to said features wherein said object is localized;
searching for a shape and appearance counterpart of said candidate object among said stored shape models and appearance models that most closely matches said object to initialize a contour; and
tracking said contour along said object in 3D incorporating said learning and classification algorithm,
initializing said contour about an object in a low-resolution version of said image;
tracking said contour along said object in said reduced resolution image to obtain a contour surface about said object; and
re-tracking said contour surface along said object in said N×N×N image to correct errors in said contour surface in said reduced resolution image;
wherein said steps of providing a database, providing a learning and classification algorithm, extracting data patches, calculating features, and tracking said contour are performed by a computer processor.

2. The method of claim 1, further comprising building a training set of 3-dimensional image volumes, and using said training set to train said learning and classification algorithm to recognize object shapes and appearances in said image volumes.

3. The method of claim 2, wherein said training set includes positive and negative examples of shapes and appearances.

4. The method of claim 2, wherein said shape models are derived from said image volumes, from human expertise, or from prior knowledge.

5. The method of claim 2, wherein said appearance models are derived from said image volumes.

6. The method of claim 1, wherein said appearance models are derived from tracking said contour along said object.

7. The method of claim 1, further comprising adaptively updating said shape models and said appearance models while tracking said contour along said object.

8. The method of claim 1, wherein said learning and classification algorithm is based on either a Bayesian classifier, boosting, or a support vector machine.

9. The method of claim 1, wherein searching for a shape counterpart comprises using a matching algorithm that uses shape and appearance features learned during training of said learning and classification algorithm, and applying their associated shapes to the candidate data patches to localize said contour.

10. The method of claim 1, wherein said contour is either an open curve in a 2-dimensional plane, a closed curve in a 2-dimensional plane, an open curve in 3-dimensions, a closed curve in 3-dimensions, or is a 3-dimensional surface.

11. A non-transitory program storage device readable by a computer, tangibly embodying a program of instructions executable by the computer to perform the method steps for three-dimensional contour tracking comprising the steps of:
providing a database of a plurality of shape models and a plurality of appearance models, wherein shape models are curves and surfaces, appearance models are voxel intensity patterns, wherein said models include 2-dimensional shape models, 3-dimensional shape models and dynamical models that describe how a contour changes as it is propagated along on object in an image;
providing a learning and classification algorithm trained using said shape models and appearance models;
providing a digitized volumetric image comprising a plurality of intensities corresponding to an N×N×N domain of points in a 3-dimensional space;
extracting one or more candidate data patches of an object from one of said images;
calculating features from said data patches and applying said learning and classification algorithm to said features to localize said object;
searching for a shape and appearance counterpart of said candidate object among said stored shape models and appearance models that most closely matches said object to initialize a contour; and
tracking said contour along said object in 3D incorporating said learning and classification algorithm;

initializing said contour about an object in a low-resolution version of said image;

tracking said contour along said object in said reduced resolution image to obtain a contour surface about said object; and re-tracking said contour surface along said object in said N×N×N image to correct errors in said contour surface in said reduced resolution image.

12. The non-transitory computer readable program storage device of claim 11, further comprising building a training set of 3-dimensional image volumes, and using said training set to train said learning and classification algorithm to recognize object shapes and appearances in said image volumes.

13. The non-transitory computer readable program storage device of claim 12, wherein said training set includes positive and negative examples of shapes and appearances.

14. The non-transitory computer readable program storage device of claim 12, wherein said shape models are derived from said image volumes, from human expertise or from prior knowledge.

15. The non-transitory computer readable program storage device of claim 12, wherein said appearance models are derived from said image volumes.

16. The non-transitory computer readable program storage device of claim 11, wherein said appearance models are derived from tracking said contour along said object.

17. The non-transitory computer readable program storage device of claim 11, the method further comprising adaptively updating said shape models and said appearance model while tracking said contour along said object.

18. The non-transitory computer readable program storage device of claim 11, wherein said learning and classification algorithm is based on either a Bayesian classifier, boosting, or a support vector machine.

19. The non-transitory computer readable program storage device of claim 11, wherein searching for a shape counterpart comprises using a matching algorithm that uses shape and appearance features learned during training of said learning and classification algorithm, and applying their associated shapes to the candidate data patches to localize said contour.

20. The non-transitory computer readable program storage device of claim 11, wherein said contour is an open curve in a 2-dimensional plane, a closed curve in a 2-dimensional plane, an open curve in 3-dimensions, a closed curve in 3-dimensions, or a 3-dimensional surface.

21. A computer implemented method for three-dimensional contour tracking comprising the steps of:

providing a digitized volumetric image comprising a plurality of intensities corresponding to an N×N×N domain of points in a 3-dimensional space;

scanning said image by one or more of translating, rotating, and scaling a window inside said image to yield one or more candidate data patches;

extracting features from each candidate data patch and applying a learning and classification algorithm to said features wherein a candidate object is localized; and searching for a counterpart of a shape and appearance of said object among shape models and appearance models stored in a database using a matching algorithm that uses shape and appearance features detected by said learning and classification algorithm, wherein shape models are curves and surfaces, appearance models are voxel intensity patterns, and said models include 2-dimensional shape models, 3-dimensional shape models and dynamical models that describe how a contour changes as it is propagated along on object in an image, initializing said contour about an object in a low-resolution version of said image;

tracking said contour along said object in said reduced resolution image to obtain a contour surface about said object; and re-tracking said contour surface along said object in said N×N×N image to correct errors in said contour surface in said reduced resolution image;

wherein said steps of scanning said image, extracting features, and searching for a counterpart are performed by a computer processor.

22. The method of claim 21, further comprising tracking said contour along said object by repeating the steps of localizing a contour about said object and searching for a counterpart of said shape of said object.

* * * * *